(12) United States Patent
Nagy et al.

(10) Patent No.: US 6,774,078 B1
(45) Date of Patent: Aug. 10, 2004

(54) OLEFIN POLYMERIZATION CATALYSTS BASED ON ANNULATED CYCLOPENTADIENYL LIGANDS

(75) Inventors: Sandor Nagy, Naperville, IL (US); Barbara M. Tsuie, Cincinnati, OH (US); Jonathan L. Schuchardt, Royersford, PA (US)

(73) Assignee: Equistar Chemicals, LP, Houston, TX (US)

(*) Notice: Subject to any disclaimer, the term of this patent is extended or adjusted under 35 U.S.C. 154(b) by 0 days.

(21) Appl. No.: 10/421,077

(22) Filed: Apr. 23, 2003

(51) Int. Cl.$^7$ ................................................ B01J 31/00
(52) U.S. Cl. ........................ 502/103; 526/160; 526/170; 526/943; 526/134; 526/114; 526/116
(58) Field of Search .............................. 526/160, 170, 526/943, 134, 114, 116; 502/103

(56) References Cited

U.S. PATENT DOCUMENTS

| | | | |
|---|---|---|---|
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,510,502 A * | 4/1996 | Sugano et al. | 556/11 |
| 5,554,775 A | 9/1996 | Krishnamurti et al. | 556/7 |
| 5,637,660 A | 6/1997 | Nagy et al. | 526/160 |
| 5,648,440 A | 7/1997 | Sugano et al. | 526/132 |
| 5,902,866 A | 5/1999 | Nagy et al. | 526/133 |
| 5,917,072 A * | 6/1999 | Banzi et al. | 556/53 |
| 6,054,405 A * | 4/2000 | Wenzel | 502/104 |
| 6,211,311 B1 | 4/2001 | Wang et al. | 526/131 |
| 6,218,558 B1 * | 4/2001 | Kato et al. | 556/12 |
| 6,232,260 B1 | 5/2001 | Nagy et al. | 502/155 |
| 6,252,097 B1 * | 6/2001 | Sugano et al. | 556/11 |
| 6,344,530 B2 | 2/2002 | Sugano et al. | 526/160 |

OTHER PUBLICATIONS

Murata et al., *Tetrahedron Lett.* 27, (1975) 2287.
Yoshida et al., *Tetrahedron Lett.* 24, (1983) 4585.
Yoshida et al., *J. Am. Chem. Soc.* 106, (1984) 6383.
Hafner et al., *Tetrahedron Lett.* 26 (1985) 2567.
Yasunami et al., *Bull. Chem. Soc. Jpn.* 66 (1993) 2273.
Yasunami et al., *Bull. Chem. Soc. Jpn.* 65 (1992) 2131.
Hafner et al., *Angew. Chem., Int. Ed. Engl.* 13 (1974) 204.
Hafner et al., *Liebigs Ann. Chem.* 624 (1959) 37.
Boekelheide et al., *J. Am. Chem. Soc.* 88 (1966) 3950.
Hafner et al., *Pure Appl. Chem.* 28 (1971) 153.
Diehl et al., *Angew. Chem., Int. Ed. Engl.* 15 (1976) 107.
Lemel et al., *J. Chem. Educ.* 65 (1988) 923.
Coplland et al., *Tetrahedron Lett.* (1977) 639.
Hafner et al., *Liebigs Ann. Chem.* 650 (1961) 35.
Wentrup et al., *J. Am. Chem. Soc.* 106 (1984) 3705.
Alder et al., *J. Chem. Soc., Perkins Trans.* 11 (1975) 714.
Kloste–Jensen, et al., *Helv. Chim. Acta* 39 (1956) 1051.
Houk et al., *J. Org. Chem.* 48 (1983) 403–405.
Jutz et al., *Chem. Ber.* 107, (1974) 2383.
S. Braun et al., *Tetrahedron* 33 (1977) 3127.
Schlosser et al., *Agnew. Chem., Int. Ed. Eng.* 12 (1973) 508.
Lochmann et al., *Tetrahedron Lett.* (1966) 257.

* cited by examiner

*Primary Examiner*—David W. Wu
*Assistant Examiner*—Rip A. Lee
(74) *Attorney, Agent, or Firm*—Jonathan L. Schuchardt

(57) ABSTRACT

A catalyst system useful for polymerizing olefins is disclosed. The catalyst system includes an organometallic complex that incorporates a Group 3 to 10 transition metal and an annulated cyclopentadienyl ligand that is pi-bonded to the metal. A one-pot method for making organometallic complexes from fulvene precursors is also disclosed. Additionally, the invention includes bimetallic complexes from cyclopentazulenyl compounds and a one-pot method for making them. Molecular modeling studies reveal that organometallic complexes incorporating such annulated cyclopentadienyl ligands, when combined with an activator such as MAO, should actively polymerize olefins.

15 Claims, No Drawings

OLEFIN POLYMERIZATION CATALYSTS BASED ON ANNULATED CYCLOPENTADIENYL LIGANDS

FIELD OF THE INVENTION

The invention relates to catalysts useful for olefin polymerization. In particular, the invention relates to catalysts based on organometallic complexes that incorporate annulated cyclopentadienyl ligands.

BACKGROUND OF THE INVENTION

Ziegler-Natta catalysts are a mainstay for polyolefin manufacture, but single-site (metallocene and non-metallocene) catalysts represent the industry's future. These catalysts are often more reactive than Ziegler-Natta catalysts, and they often produce polymers with improved physical properties.

Many single-site catalysts incorporate cyclopentadienyl, indenyl, or fluorenyl ligands ("Cp-like ligands"). Much less is known about the impact of using ligands in which the negative charge of the ligand is potentially more highly delocalized. On the other hand, annealing benzo or other unsaturation-containing rings onto the traditional Cp-like framework is a potentially powerful way to perturb and control catalyst performance compared with the performance of traditional metallocenes.

Precursors to a number of potential annulated cyclopentadienyl ligands are known. For example, Murata et al. (*Tetrahedron Lett.* (1975) 2287) reported the synthesis of a cyclopenta[cd]phenalenyl anion, and concluded from $^1$H NMR studies that the anion is symmetrical and highly delocalized. No transition metal complexes were made.

Cyclopentazulenyl ring systems have also been prepared. For example, Yoshida et al. (*Tetrahedron Lett.* 24 (1983) 4585; *J. Am. Chem. Soc.* 106 (1984) 6383) concluded from $^1$H and $^{13}$C NMR studies that the negative charge in the cyclopent[e]azulenyl anion is highly delocalized. No transition metal complexes were made.

Hafner et al (*Tetrahedron Left.* 26 (1985) 2567) synthesized some cyclopent[f]azulenyl monoanions by reacting the parent compounds with n-butyllithium. Interestingly, a second mole of n-butyllithium adds to the fulvene moiety (the 4-position) of the anion to generate a monoalkylated, dianion:

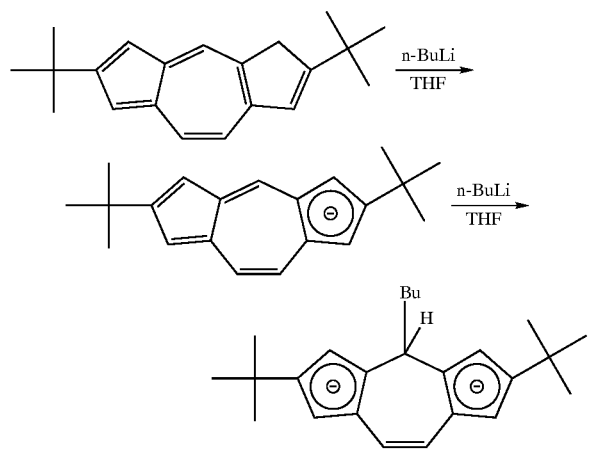

Hafner did not report organometallic complexes made from either the monoanions or the dianions. Complexes from monoanionic cyclopent[e]- and cyclopent[f]azulenyl ligands would be of considerable theoretical interest because of the potential for fluxional behavior. With two degenerate coordination sites, the complexes might undergo haptotropic rearrangements in which a metal migrates from one Cp ring to another to form a different complex that is its energetic equal.

Synthetic routes to cyclopent[a]azulenes and cyclopent[cd]azulenes have also been reported (see, e.g., Yasunami et al., *Bull. Chem. Soc. Jpn.* 66 (1993) 2273; 65 (1992) 2131; Hafner et al., *Angew. Chem., Int. Ed. Engl.* 13 (1974) 204; *Liebigs Ann. Chem.* 624 (1959) 37), but organometallic complexes from these and other cyclopentazulenyl ligand precursors are generally unknown. The cyclopent[cd] azulenes lack an acidic hydrogen.

Benzazulenes represent yet another kind of annulated cyclopentadienyl precursor that has not been used for transition metal catalysts. For example, Boekelheide et al. (*J. Am. Chem. Soc.* 88 (1966) 3950) reported the synthesis of 2H-benz[cd]azulenes starting from acenaphthenes. Deprotonation of benz[cd]azulenes should generate a an annulated cyclopentadienyl ligand, but this was not attempted by the authors.

Other benzazulenes—including benz[a]azulene, benz[e] azulene, and benz[f]azulene—have been synthesized, but these compounds lack an acidic hydrogen, and they have apparently not been used as ligand precursors for transition metal complexes. On the other hand, the compounds have a fulvene unit and are potential "annulated cyclopentadienyls" via nucleophilic addition.

Still other classes of compounds that lack an acidic hydrogen but are convertable to annulated cyclopentadienyl ligands include cyclopentaheptalenes or "aceheptylenes" (see, e.g., Hafner et al., *Pure Appl. Chem.* 28 (1971) 153; *Angew. Chem., Int.Ed. Engl.* 15 (1976) 107), fluoranthenes, and acenaphthylenes. Transition metal complexes have not been reported.

Azulenes in general have seldom been used in making single-site catalysts, probably because they can be challenging to synthesize. However, a simple synthesis (suitable for use by students) of the parent compound has been reported (*J. Chem. Educ.* 65 (1988) 923) based on a route developed by Copland et al. (*Tetrahedron Lett.* (1977) 639.)

Nucleophilic addition of alkyllithiums to the fulvene system of azulenes is known as part of a three-step way to make 4-alkylazulenes (see *Liebigs Ann. Chem.* 650 (1961) 35). A similar nucleophilic addition was used by Sugano et al. (see, e.g., U.S. Pat. No. 6,344,530) in a multistep preparation of olefin polymerization catalysts that incorporate bridged bis(4-hydroazulenyl) complexes. In a representative example, phenyllithium adds to a 2-alkylazulene to generate a Cp-like anion, which reacts with 0.5 equivalents of dichlorodimethylsilane to give a dimethylsilyl-bridged bis (azulene). In a second step, double deprotonation followed by combination of the dianion with zirconium tetrachloride gives a bridged complex (see the '530 patent at col. 57–58).

The polyolefins industry continues to need new polymerization catalysts. In particular, the industry needs catalysts having activities that are as good or better than the activities of single-site catalysts based on cyclopentadienyl, indenyl, and fluorenyl ligands. A valuable catalyst would incorporate ligands that can stabilize a cationically active site (as a Cp-like ligand does) without sacrificing much reactivity toward olefin monomers. Ideally, the catalysts could be made economically using well-established synthetic routes.

SUMMARY OF THE INVENTION

The invention is a catalyst system useful for polymerizing olefins. The catalyst system comprises an activator and an organometallic complex. The complex incorporates a Group 3–10 transition metal and an annulated cyclopentadienyl ligand that is pi-bonded to the metal. In particular, the annulated cyclopentadienyl ligand is a cyclopentazulenyl, benzazulenyl, cyclopentaheptalenyl, fluoranthenyl, acenaphthylenyl, or cyclopentaphenalenyl ligand. Molecular modeling studies reveal that organometallic complexes incorporating such annulated cyclopentadienyl ligands, when combined with an activator such as MAO, should actively polymerize olefins.

The invention includes a one-pot method for making organometallic complexes useful for olefin polymerization catalysis. The method comprises reacting a fulvene precursor with an organolithium, -sodium, -potassium, -magnesium, or -aluminum compound to produce a monoalkylated or monoarylated anionic adduct having a cyclopentadienyl moiety. Once generated, the anion is combined in the same reactor with a transition metal source to produce the organometallic complex. The invention also includes bimetallic complexes from cyclopentazulenes and a one-pot method for making them.

DETAILED DESCRIPTION OF THE INVENTION

Catalyst systems of the invention include an organometallic complex and an activator. The complex contains a Group 3–10 transition metal. "Transition metal" as used herein includes, in addition to the main transition group elements, elements of the lanthanide and actinide series. More preferred complexes include a Group 4 or a Group 8 to 10 transition metal.

The organometallic complex includes an anionic, annulated cyclopentadienyl ligand that is pi-bonded to the metal. The annulated cyclopentadienyl ligand is selected from cyclopentazulenyls, cyclopentaheptalenyls (also called "aceheptylenyls"), benzazulenyls, fluoranthenyls, acenaphthylenyls, and cyclopentaphenalenyls.

The ligand is anionic. While it can be generated by any suitable technique, there are two generally preferred methods. In one approach, a ligand precursor is simply deprotonated at the cyclopentadienyl ring, or at another ring, such that an annulated cyclopentadienyl ligand is generated. Cyclopenta[cd]phenalenes, for example, upon deprotonation at a six-membered ring should give an annulated cyclopentadienyl ligand. In the second preferred method, the anion is generated by adding a nucleophile to a neutral fulvene precursor to produce the annulated cyclopentadienyl ligand. Examples of these approaches are shown below.

The framework of the annulated cyclopentadienyl ligand can be substituted with other atoms that do not interfere with the ability of the anionic ligand to form complexes with transition metals. For example, the framework of the annulated cyclopentadienyl ligand can be substituted with alkyl, aryl, halide, alkoxy, thioether, alkylsilyl, or other groups.

Annulated cyclopentadienyl ligands can be made by any suitable method. Fluoranthene and acenaphthylene are commercially available. Synthetic routes to cyclopentaphenalenyl, benzazulenyl, cyclopent-azulenyl, and cyclopentaheptalenyl precursors have been developed. See *Tetrahedron Lett.* (1975) 2287 (cyclopenta[cd]phenalene); *Tetrahedron Lett.* 24 (1983) 4585 and *J. Am. Chem. Soc.* 106 (1984) 6383 (cyclopent[e]azulene); *Tetrahedron Lett.* 26 (1985) 2567 (cyclopent[f]azulene); *Bull Chem. Soc. Jpn.* 66 (1993) 2273 and 65 (1992) 2131 (cyclopent[a]azulene); *Angew. Chem., Int. Ed. Engl.* 13 (1974) 204; *Liebigs Ann. Chem.* 624 (1959) 37 (cyclopent [cd]azulene); *J. Am. Chem. Soc.* 88 (1966) 3950 (benz[cd]azulene); *J. Am. Chem. Soc.* 106 (1984) 3705 and *J. Chem. Soc., Perkin Trans. II* (1975) 714 (benz[a]azulene); *Helv. Chim. Acta* 39 (1956) 1051 (benz[e]azulene); *J. Org. Chem.* 48 (1983) 403 (benz[f]azulene); and Pure Appl. Chem. 28 (1971) 153; *Angew. Chem., Int. Ed. Engl.* 15 (1976) 107; *Chem. Ber.* 107 (1974) 2383; and *Tetrahedron* 33 (1977) 3127 (cyclopent[cd]azulene and cyclopenta[ef]heptalene).

In preferred catalyst systems, the annulated cyclopentadienyl ligand is selected from the group consisting of cyclopenta[cd]phenalenyls, benz[cd]azulenyls, benz[a]azulenyls, benz[e]azulenyls, benz[f]azulenyls, cyclopent[f]azulenyls, cyclopent[e]azulenyls, cyclopent[cd]azulenyls, cyclopent[f]azulenyls, fluoranthenyls, acenaphthylenyls, and cyclopenta[ef]heptalenyls.

Usually, the ligand is generated by deprotonating a precursor that has an acidic hydrogen. Such is the case, for example, with cyclopenta[cd]phenalenyls, benz[cd]azulenyls, cyclopent[a]azulenyls, cyclopent[e]azulenyls, and cyclopent[f]azulenyls. Deprotonation methods are well known. Suitable bases include, for example, alkyllithium compounds (e.g., methyllithium or n-butyllithium), alkali metals (e.g., sodium metal), alkali metal hydrides (e.g., potassium hydride), and Grignard reagents (e.g., methyl magnesium chloride or phenyl magnesium bromide). Particularly preferred deprotonating agents are super-basic reagents prepared by the reaction of alkyllithium compounds and alkali metal t-butoxides, as reported by Schlosser et al. (*Angew. Chem., Int. Ed. Engl.* 12 (1973) 508) and Lochmann et al. (*Tetrahedron Lett.* (1966) 257).

Usually, about one equivalent of the deprotonating agent and about one equivalent of the precursor are used to produce the anionic ligand. Deprotonation can be performed at any suitable temperature, preferably at or below room temperature. While the deprotonation reaction can be performed at temperatures as low as −78° C. or below, it is preferred to perform this step at room temperature. The examples below illustrate the deprotonation approach to making annulated cyclopentadienyl ligands:

1) from cyclopen[a]azulenes:

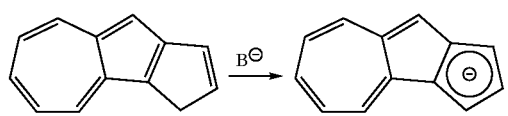

2) from cyclopent[e]azulenes:

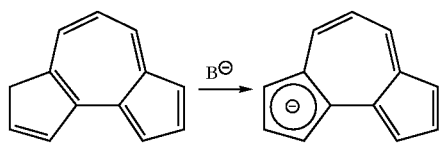

3) from cyclopent[f]azulenes:

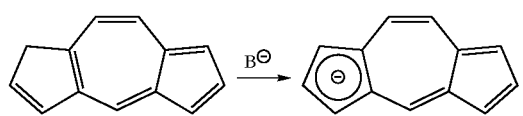

4) from benz[cd]azulenes:

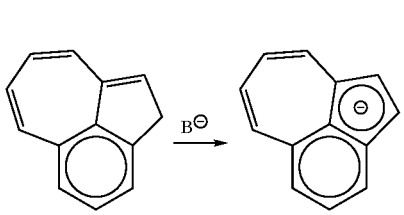

5) from cyclopentaphenalenes:

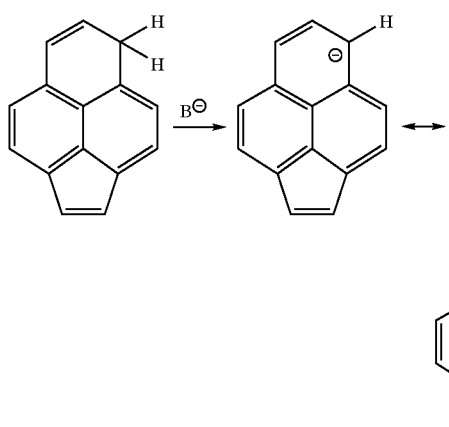

An alternative to deprotonation involves adding a nucleophilic reagent to a neutral fulvene precursor to generate a ligand that incorporates a cyclopentadienyl anion. This is an excellent way to make annulated cyclopentadienyl ligands from benzazulenes such as benz[a]azulene, benz[e]azulene, and benz[f]azulene. Other azulene precursors that contain a fulvene moiety can also be used, including cyclopent[cd]azulenes and cyclopentaheptalenes. Nucleophiles will also add to the fulvene moiety of fluoranthenes and acenaphthylenes. The examples below illustrate the nucleophilic addition approach to making annulated cyclopentadienyl ligands:

1) from benz[a]azulenes:

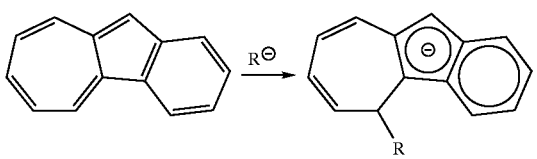

2) from benz[e]azulenes:

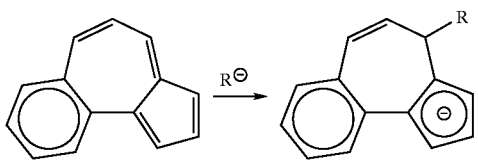

3) from benz[f]azulenes:

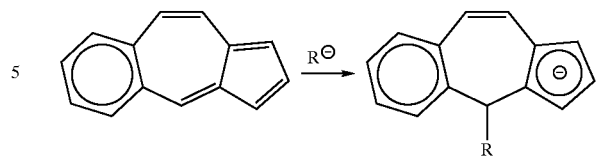

4) from cycloopenta[ef]heptalenes (aceheptylenes):

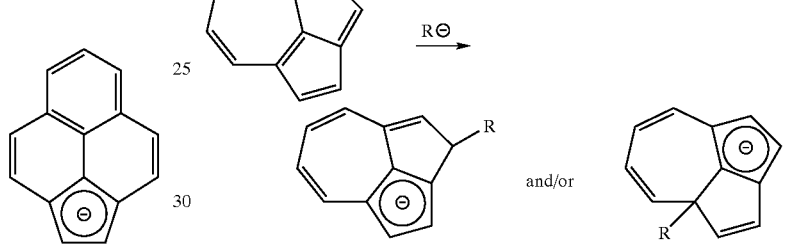

5) from cyclopent[cd]azulenes:

6) from fluoranthenes:

7) from acenaphthylenes:

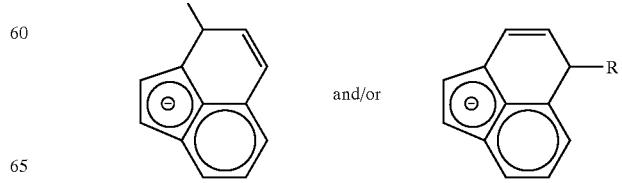

A variety of other compounds that incorporate a fulvene or azulene moiety can be used in similar fashion. For a cornucopia of synthetic approaches, see K. Hafner, *Pure Appl. Chem.* 28 (1971) 153 and references cited therein.

In addition to the annulated cyclopentadienyl ligand, the organometallic complex may include additional labile anionic ligands such as halides, alkyls, alkaryls, aryls, dialkylaminos, or the like. Particularly preferred are halides, alkyls, and alkaryis (e.g., chloride, methyl, benzyl). Polymerization-stable ligands, such as cyclopentadienyl, indenyl, fluorenyl, boraaryl, indolyl, indenoindolyl, quinolinoxy, pyridinoxy, or the like, can also be present. For examples of the heteroaryl ligands, see U.S. Pat. Nos. 5,554,775, 5,902,866, 5,637,660, and 6,232,260, the teachings of which are incorporated herein by reference.

The organometallic complexes can be conveniently prepared according to methods that are well known in the art. In general, the complexes are made by combining the anionic ligand with a transition metal source. Any convenient source of transition metal can be used. For example, the complexes can be made from transition metal halides, alkyls, alkoxides, acetates, amides, or the like. A particularly convenient source of the transition metal is the transition metal halide. For example, one can use titanium tetrachloride, zirconium tetrachloride, cyclopentadienylzirconium trichloride, vanadium(III) chloride-tetrahydrofuran complex (VCl$_3$(THF)$_3$), titanium (III) chloride-THF complex, chromium(III) chloride-THF complex, cobalt(II) chloride, nickel(II) bromide, platinum(II) chloride, allylnicke(II) chloride dimer, palladium(II) chloride, lanthanum(III) chloride, titanium(III) acetate, or the like. Complexes can also be prepared from salts with labile groups, such as tetrakis(acetonitrile)palladium(II) bis (tetrafluoroborate).

The transition metal complexes are easy to make. Usually, the transition metal source (halide, e.g.) is dissolved or suspended in an organic solvent and the anionic ligand is carefully added at any desired temperature, preferably from about –78° C. to about room temperature. Refluxing is used if needed to complete the reaction. Insoluble by-products, if any, can be removed by filtration, solvents are evaporated, and the transition metal complex is isolated, washed, and dried. The resulting complex can generally be used without further purification. Examples 1–7 below illustrate a few suitable methods for making the organometallic complexes.

In sum, a wide variety of organometallic complexes incorporating annulated cyclopentadienyl ligands are readily accessible for use in catalyst systems of the invention. The complexes and methods discussed herein for making them are merely illustrative, and those skilled in the art will readily recognize or devise many alternative synthetic methodologies.

The catalyst systems include an activator. Suitable activators help to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutylaluminum), and the like. Suitable activators include acid salts that contain non-nucleophilic anions. These compounds generally consist of bulky ligands attached to boron or aluminum. Examples include lithium tetrakis(pentafluorophenyl) borate, lithium tetrakis(pentafluorophenyl)aluminate, anilinium tetrakis (penta-fluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl) borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The optimum amount of activator needed relative to the amount of organometallic complex depends on many factors, including the nature of the complex and activator, whether a supported catalyst is used, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M.

The activator is normally added to the reaction mixture at the start of the polymerization. However, when a supported catalyst system is used, the activator can be deposited onto the support along with the organometallic complex.

The catalyst systems are optionally used with an inorganic solid or organic polymer support. Suitable supports include silica, alumina, silica-aluminas, magnesia, titania, clays, zeolites, or the like. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No 6,211,311, the teachings of which are incorporated herein by reference.

The complex and activator can be deposited on the support in any desired manner. For instance, the components can be dissolved in a solvent, combined with a support, and stripped. Alternatively, an incipient-wetness technique can be used. Moreover, the support can simply be introduced into the reactor separately from the complex and activator.

The loading of complex on the support varies depending upon a number of factors, including the identities of the complex and the support, the type of olefin polymerization process used, the reaction conditions, and other concerns. Usually, the amount of complex used is within the range of about 0.01 to about 10 wt. % of transition metal based on the amount of supported catalyst. A more preferred range is from about 0.1 to about 4 wt. %.

The invention includes a one-pot method for making organometallic complexes. The method comprises reacting a fulvene precursor with about one equivalent of an organolithium, -sodium, -potassium, -magnesium, or -aluminum compound to produce a monoalkylated or monoarylated anionic adduct having a cyclopentadienyl moiety. In the same reactor, the anionic adduct resulting from nucleophilic addition is combined with a transition metal source to produce the organometallic complex in one pot from the fulvene. The preparation of an azulenyl complex in one pot from methyllithium and cyclopentadienylzirconium trichloride exemplifies the simplicity of the approach:

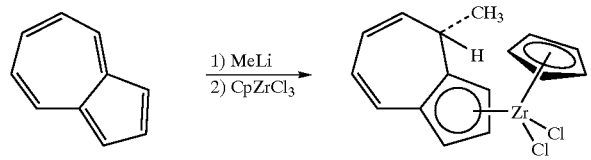

Suitable fulvene precursors include fluoranthenes, acenaphthylenes, and azulenes. The fulvene precursor should have no acidic hydrogens, i.e., the fulvene precursor should have a pKa value less than about 40 (about the acidity of the methyl protons on toluene). Suitable precursors include azulenes, fluoranthenes, and acenaphthylenes that are substituted with alkyl, aryl, halide, thioalkyl, trialkylsilyl, or other groups that do not interfere with nucleophilic addition, generation of a transition metal complex from the adduct, or use of the complex in an olefin polymerization. Additional rings can be annealed to the fulvene precursor skeleton. Thus, suitable precursors include the benzazulenes, cyclopentazulenes, and cyclopentaheptalenes described earlier. Particularly preferred fulvene precursors are azulene, fluoranthene, acenaphthylene, cyclopent[cd]azulenes, cyclopenta[ef]heptalenes, benz[a] azutenes, benz[e]azulenes, and benz[f]azulenes. The precursors have, in common, fulvene units that are capable of adding a nucleophilic reagent such as an organolithium compound or a Grignard reagent to generate a cyclopentadienyl anion.

Suitable organolithium, -sodium, -potassium, -magnesium, and -aluminum reagents are well known. Many are commercially available. Others are easily synthesized just prior to use by reacting an alkyl or aryl halide with an alkali or alkaline earth metal. Examples include methyllithium, n-butyllithium, t-butyllithium, methylmagnesium bromide, phenylmagnesium chloride, and the like.

When about one equivalent of nucleophilic reagent is added to the fulvene precursor, a monoalkylated or monoarylated anionic adduct is produced. The adduct is not isolated. Instead, it is combined following preparation with a transition metal source to produce the desired organometallic complex. Suitable transition metal sources have been described already. Usually, it is convenient to add the nucleophilic reagent to a solution of the fulvene precursor in a dry organic solvent, typically an ether, a hydrocarbon, or a mixture of these, at or below room temperature. Some warming may be needed to complete the formation of the anionic adduct. The transition metal source is then combined with the anionic adduct at any desired temperature, preferably at about room temperature, to generate the organometallic complex. By-product salts can be removed by filtration. Concentration of the mixture gives an organometallic complex that is usually ready to use in an olefin polymerization reaction. Examples 1–2 below illustrate the preparation of azulenyl complexes of zirconium in one pot from azulene.

The invention includes a bimetallic catalyst system that is useful for polymerizing olefins. The catalyst system includes an activator (as described earlier) and a bimetallic complex. The complex incorporates two Group 3–10 transition metals, which may be the same or different, and a dianionic cyclopentazulenyl ligand that is pi-bonded to each of the metals.

Preferred precursors for the bimetallic catalyst systems are cyclopent[a]azulenes, cyclopent[e]azulenes, and cyclopent[f]azulenes. As described earlier, deprotonation of these cyclopentazulenes results in an annulated cyclopentadienyl anion. This anion can be further reacted with a second equivalent of nucleophilic reagent (see Hafner et al., *Tetrahedron Lett*. 26 (1985) 2567), which will add to the fulvene moiety (the 4-position) of the monoanion to generate a monoalkylated dianion. For example, consider the reaction of cyclopent[e]azulene with two equivalents of methyllithium. Reaction of the resulting dianion with two equivalents of a transition metal source, such as cyclopentadienylzirconium trichloride, should give the desired bimetallic complex:

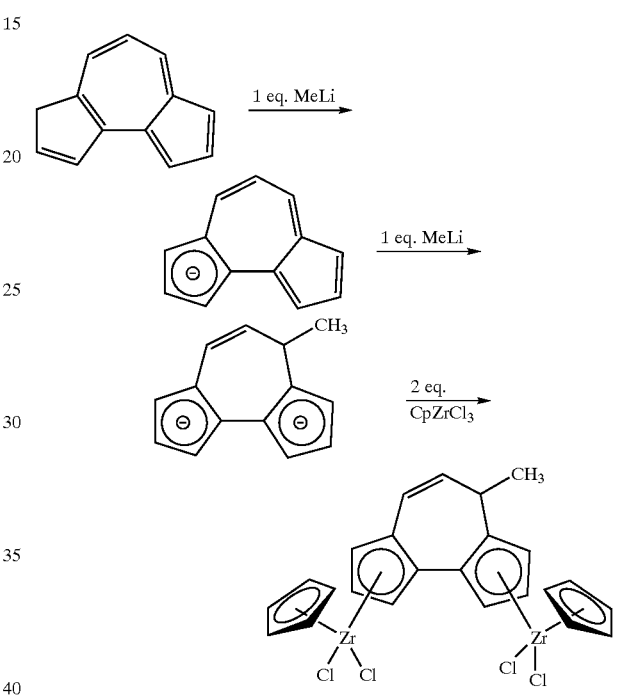

While similar bimetallic complexes can be made by any suitable method, they are conveniently made in one reaction vessel. Thus, the invention includes a one-pot method for making the bimetallic complexes. In this method, a cyclopentazulene reacts with about two equivalents of an organolithium, -sodium, -potassium, -magnesium, or -aluminum compound to produce a monoalkylated or monoarylated cyclopentazulenyl dianion. This dianion is combined in the same reactor with about two equivalents of a transition metal source to produce the bimetallic complex.

Catalyst systems of the invention are useful for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes.

The olefin polymerizations can be performed over a wide temperature range, such as about −30° C. to about 280° C. A more preferred range is from about 30° C. to about 180°

C.; most preferred is the range from about 60° C. to about 100° C. Olefin partial pressures normally range from about 15 psig to about 50,000 psig. More preferred is the range from about 15 psig to about 1000 psig.

The following examples merely illustrate the invention. Those skilled in the art will recognize many variations that are within the spirit of the invention and scope of the claims.

EXAMPLE 1

Preparation of Organometallic Complex 1 and Use as an Olefin Polymerization Catalyst Methyllithium (1.3 mL of 1.4 M solution in diethyl ether, 1.82 mol) is added to a blue solution of azulene (0.19 g, 1.50 mmol) in diethyl ether (20 mL). The mixture is warmed gently to reflux overnight. The blue color disappears, and a solid precipitates. Volatiles are removed under vacuum, and the white solid is collected and dried under vacuum (0.15 g, 0.99 mmol, 66%). The solid is added to a slurry of cyclopentadienylzirconium trichloride (0.25 g, 0.98 mmol) in toluene (10 mL) and diethyl ether (10 mL). The mixture turns orange and is kept at room temperature overnight. The mixture is filtered, and the filtrate is evaporated to obtain a dark-red, gummy solid (0.16 g, 44%). Analysis by $^1$H NMR (CD$_2$Cl$_2$) indicates that the solid is desired complex 1.

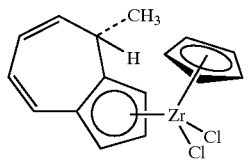

1

The methyl groups from the two possible stereoisomers appear as doublets at 1.35 (major isomer) and 1.58 (minor isomer). The methine protons appear as a multiplet at 3.53 ppm. The Cp-H protons appear as a singlet at 6.45 ppm. None of the signals from starting material azulene (7.0–8.5 ppm) are present, indicating complete conversion.

A solution of complex 1 (10 mg) in methylalumoxane (1.28 mL of 30% PMAO in toluene, product of Albemarle) is added slowly to ES757 silica (1.0 g, calcined 4 h at 250° C. prior to use, product of Ineos). The resulting free-flowing, light-yellow powder is suitable for use as a polymerization catalyst.

A two-liter reactor is charged with isobutane (900 mL), 1-butene (10 mL), and triisobutylaluminum (1.0 mL of 1.0 M solution in hexanes, 1.0 mmol). The reactor is heated to 70° C. and is pressurized with ethylene to 250 psig. A slurry of the supported catalyst (0.24 g) in isobutane (100 mL) is injected into the reactor to start the polymerization. Ethylene is supplied on demand at 250 psig, and the reaction proceeds at 70° C. for 1 h. The reactor is vented to recover polyethylene (42 g). Activity: 172 kg PE/g Zr/h. MI$_2$: 0.77; MIR: 18.4 (narrow molecular weight distribution that is characteristic of polyolefins made with single-site catalysts). FT-IR spectroscopy analysis shows that the polymer contains about 6.4 branches per 1000 carbons (demonstrates efficient comonomer incorporation).

EXAMPLE 2

Preparation of Organometallic Complex 2 n-Butyllithium (1.2 mL of 1.6 M solution in hexane, 1.92 mmol, 1.1 eq.) is added to a blue solution of azulene (0.22 g, 1.7 mmol) in diethyl ether (25 mL) under an atmosphere of dry nitrogen. The mixture turns orange immediately, but no precipitate is observed. The mixture warms to room temperature over about 2 h, then begins to darken. The anion solution is transferred by cannula to a slurry of cyclopentadienylzirconium trichloride (0.45 g, 1.7 mmol) in toluene (15 mL) and diethyl ether (15 mL). The mixture turns orange-brown and is kept at room temperature overnight. Volatiles are removed, and the resulting brown oil is dried overnight under vacuum. Analysis of the oil by $^1$H NMR (CD$_2$Cl$_2$) indicates the presence of desired complex 2.

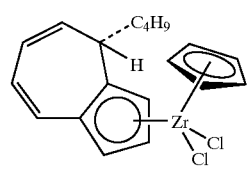

2

The presence of two stereoisomers is suggested by a pair of Cp-H singlets at 6.25 and 6.40 ppm. Other signals are consistent with the spectrum obtained in Example 1. None of the signals from starting material azulene (7.0–8.5 ppm) are present, indicating complete conversion.

EXAMPLE 3

Preparation of Organometallic Complex 3

Aceheptylene is prepared as described by Hafner (*Pure Appl. Chem.* 28 (1971) 153). The procedure of Example 1 is then repeated using aceheptylene (0.27 g, 1.5 mmol) instead of azulene. After reacting the anionic adduct with cyclopentadienylzirconium trichloride, the complex should have structure 3:

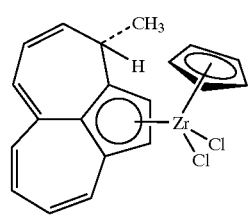

3

EXAMPLE 4

Preparation of Organometallic Complex 4

Benz[f]azulene is prepared as described by Houk et al. (*J. Org. Chem.* 48 (1983) 404). The procedure of Example 1 is then repeated using benz[f]azulene (0.27 g, 1.5 mmol) instead of azulene. After reacting the anionic adduct with cyclopentadienylzirconium trichloride, the complex should have structure 4:

13

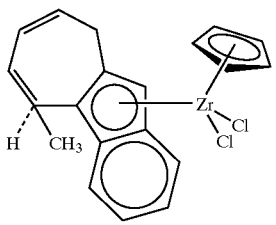

4

EXAMPLE 5

Preparation of Organometallic Complex 5

The procedure of Example 1 is repeated using fluoranthene (0.30 g, 1.5 mmol) instead of azulene. After reacting the anionic adduct with cyclopentadienylzirconium trichloride, the product mixture should contain a complex having structure 5:

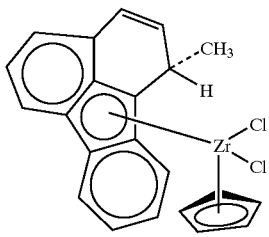

5

EXAMPLE 6

Preparation of Organometallic Complex 6

Cyclopent[e]azulene is prepared as described by Yoshida et al. (*Tetrahedron Lett.* 24 (1983) 4585). A solution of the cyclopent[e]azulene (0.25 g, 1.5 mmol) in dry diethyl ether (20 mL) is then deprotonated by reacting it with methyllithium (1.3 mL of 1.4 M solution in diethyl ether, 1.82 mol). The anion mixture is combined at room temperature with a slurry of cyclopentadienylzirconium trichloride (0.37 g, 1.50 mmol) in toluene (10 mL) and diethyl ether (10 mL). The mixture is kept at room temperature overnight. The mixture is filtered, and the filtrate is evaporated. The residue should be an organometallic complex having structure 6:

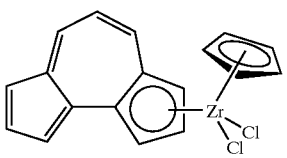

6

EXAMPLE 7

Preparation of Organometallic Complex 7

2H-Benz[cd]azulene is prepared as described by Boekelheide et al. (*J. Am. Chem. Soc.* 88 (1966) 3950). A solution of the 2H-benz[cd]azulene (0.22 g, 1.5 mmol) in dry diethyl ether (20 mL) is then deprotonated by reacting it with methyllithium (1.3 mL of 1.4 M solution in diethyl ether, 1.82 mol). The anion mixture is combined at room temperature with a slurry of cyclopentadienylzirconium trichloride (0.37 g, 1.50 mmol) in toluene (10 mL) and diethyl ether (10 mL). The mixture is kept at room temperature overnight. The mixture is filtered, and the filtrate is evaporated. The residue should be an organometallic complex having structure 7:

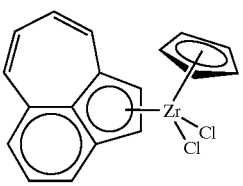

7

EXAMPLE 8

Preparation of Bimetallic Organometallic Complex 8

Cyclopent[e]azulene is prepared as described by Yoshida et al. (*Tetrahedron Lett.* 24 (1983) 4585). Methyllithium (2.6 mL of 1.4 M solution in diethyl ether, 3.64 mol, 2.4 eq.) is added to a solution of cyclopent[e]azulene (0.25 g, 1.5 mmol) in diethyl ether (20 mL). The mixture is warmed gently to reflux overnight. Volatiles are removed under vacuum at room temperature. The residue is combined at room temperature with a slurry of cyclopentadienylzirconium trichloride (0.76 g, 3.0 mmol) in toluene (10 mL) and diethyl ether (10 mL). The mixture is kept at room temperature overnight. The mixture is filtered, and the filtrate is evaporated. The residue is expected to be a bimetallic complex having structure 8:

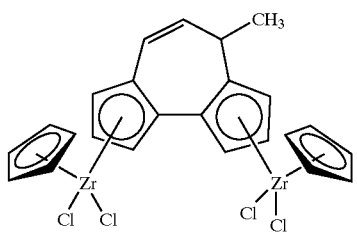

8

EXAMPLE A

Polyethylene Preparation—General Procedure

Methyl alumoxane (5 mL of 10 wt. % MAO in toluene) is added to a 100-mg sample of any of the organometallic complexes prepared in Examples 2–8. The mixture is injected into a 1.7-L stainless-steel autoclave containing dry, deoxygenated isobutane (850 mL) and triisobutylaluminum (0.2 mmol). The autoclave is heated to 80° C. and is pressurized with ethylene (150 psi). After 1 h, the autoclave is cooled, isobutane is flashed off. In each case, the resulting product should be polyethylene.

MOLECULAR MODELING STUDY

Additional evidence for the suitability of annulated cyclopentadienyl anions as ligands for olefin polymerization catalysts comes from molecular modeling studies. All calculations have been performed with complete geometry optimization using the DFT model B3LYP with the LACVP** pseudopotential basis set as incorporated into the TITAN™ software package.

To estimate the effect of annulated cyclopentadienyl ligands (L) on the relative stability of the zirconocenium active sites, we use the relative enthalpy ($\Delta\Delta H_1$) of the reaction:

LCpZrMeEt→LCpZrEt$^+$+Me$^-$ compared with the enthalpy of a standard process in which the zirconium is bonded to two cyclopentadienyl ligands:

Cp$_2$ZrMeEt→Cp$_2$ZrEt$^+$+Me$^-$

According to these estimates (Table 1), each of anions 9–13 should stabilize an electrophilic active site more effectively than a cyclopentadienyl ligand

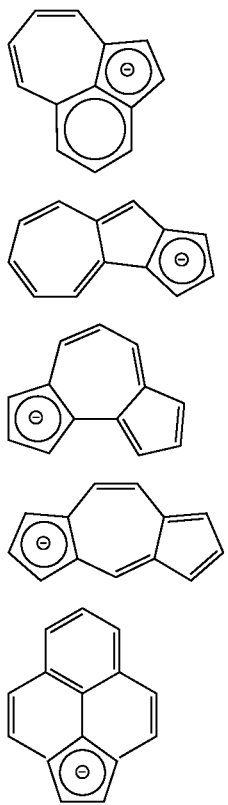

TABLE 1

| Complex | $\Delta\Delta H_f$, kcal/mole |
|---|---|
| Cp$_2$ZrMeEt | 0 |
| (Ind)(Cp)ZrMeEt | 5.0 |
| (Flu)(Cp)ZrMeEt | −8.0 |
| Flu$_2$ZrMeEt | −14 |
| (9)(Cp)ZrMeEt | −7.0 |
| (10)(Cp)ZrMeEt | −15 |
| (11)(Cp)ZrMeEt | −5.0 |
| (12)(Cp)ZrMeEt | −4.0 |
| (13)(Cp)ZrMeEt | −4.5 |

The increased stability of the active site for the complexes based on annulated cyclopentadienyl ligands permits a high concentration of active sites in the polymerization process, which should produce a more active catalyst.

The increased stability of the zirconocenium cation with the annulated cyclopentadienyl ligand should have relatively little impact (<6 kcal/mole) on its reactivity toward ethylene as characterized by the calculated heat of interaction upon pi-complexation (Table 2). Active sites from complexes that incorporate annulated cyclopentadienyl ligands 11–13 have about equal estimated energies of pi-complexation compared with the corresponding indenyl or fluorenyl complexes (all 2–3 kcal/mol).

Complexes from ligands 9–10 have estimated energies of pi-complexation that are about equal to those of the bis (fluorenyl) complex (4–5 kcal/mol).

TABLE 2

| Active site | Relative heat of interaction of active site with ethylene, kcal/mol |
|---|---|
| Cp$_2$ZrEt+ | 0 |
| (Ind)(Cp)ZrEt+ | 2.0 |
| (Flu)(Cp)ZrEt+ | 2.0 |
| Flu$_2$ZrEt+ | 4.2 |
| (9)(Cp)ZrEt+ | 5.1 |
| (10)(Cp)ZrEt+ | 5.5 |
| (11)(Cp)ZrEt+ | 2.4 |
| (12)(Cp)ZrEt+ | 2.9 |
| (13)(Cp)ZrEt+ | 2.0 | the preceding examples are meant only as illustrations; the following claims define the invention.

We claim:

1. A catalyst system which comprises an activator and an organometallic complex, wherein the complex incorporates a Group 3–10 transition metal and an anionic, annulated cyclopentadienyl ligand that is pi-bonded to the metal, wherein the ligand is selected from the group consisting of cyclopentazulenyls, cyclopentaheptalenyls, benzazulenyls, acenaphthylenyls, fluoranthenyls, and cyclopentaphenalenyls.

2. The catalyst system of claim 1 wherein the activator is selected from the group consisting of alkyl alumoxanes, alkylaluminum compounds, aluminoboronates, organoboranes, ionic borates, and ionic aluminates.

3. The catalyst system of claim 1 wherein the transition metal is a Group 4 metal.

4. The catalyst system of claim 1 wherein the transition metal is a Group 8–10 metal.

5. The catalyst system of claim 1 wherein the annulated cyclopentadienyl ligand is selected from the group consisting of acenaphthylenyls, fluoranthenyls, cyclopenta[cd] phenalenyls, benz[cd]-azulenyls, benz[a]azulenyls, benz[e] azulenyls, benz[f]azulenyls, cyclopent[a]azulenyls, cyclopent[e]azulenyls, cyclopent[cd]azulenyls, cyclopent[f] azulenyls, and cyclopenta[ef]heptalenyls.

6. A one-pot method for making an organometallic complex, said method comprising reacting a fulvene precursor selected from the group consisting of acenaphthylenes, fluoranthenes, and azulenes with about one equivalent of an organolithium, -sodium, -potassium, -magnesium or -aluminum compound to produce a monoalkylated or monoarylated anionic adduct having a cyclopentadienyl moiety, and in the same reactor, combining the adduct with a transition metal source to produce the organometallic complex.

7. The method of claim 6 wherein the fulvene precursor is selected from the group consisting of azulene, acenaphthylene, fluoranthene, cyclopent[cd]azulenes, cyclopenta[e]heptalenes, benz[a]azulenes, benz[e]azulenes, and benz[f]azulenes.

8. The method of claim 6 wherein the fulvene precursor reacts with an organolithium compound or a Grignard reagent to produce the anionic adduct.

9. The method of claim 6 wherein the transition metal source is cyclopentadienylzirconium trichloride.

10. A catalyst system which comprises an activator and a bimetallic complex, wherein the complex incorporates two Group 3–10 transition metals, which may be the same or different, and a dianionic cyclopentazulenyl ligand that is pi-bonded to each of the metals.

11. The catalyst system of claim 10 wherein the activator is selected from the group consisting of alkyl alumoxanes, alkylaluminum compounds, aluminoboronates, organoboranes, ionic borates, and ionic aluminates.

12. The catalyst system of claim 10 wherein both transition metals are zirconium.

13. A one-pot method for making a bimetallic complex, said method comprising reacting a cyclopentazulene with about two equivalents of an organolithium, -sodium, -potassium, -magnesium or -aluminum compound to produce a monoalkylated or monoarylated cyclopentazulenyl dianion, and in the same reactor, combining the dianion with a transition metal source to produce the bimetallic complex.

14. A process which comprises polymerizing one or more olefins in the presence of a catalyst system of claim 1.

15. A process which comprises polymerizing one or more olefins in the presence of a catalyst system of claim 10.

* * * * *